United States Patent [19]
Norrie

[11] Patent Number: 4,600,265
[45] Date of Patent: Jul. 15, 1986

[54] INFRA-RED OPTICAL SYSTEMS

[75] Inventor: David G. Norrie, St. Asaph, Wales

[73] Assignee: Pilkington P.E. Limited, United Kingdom

[21] Appl. No.: 573,486

[22] Filed: Jan. 24, 1984

[30] Foreign Application Priority Data

Jan. 27, 1983 [GB] United Kingdom ............... 8302230

[51] Int. Cl.<sup>4</sup> .......................... G02B 3/00; G02B 23/00
[52] U.S. Cl. .................................... 350/1.3; 350/443; 350/453
[58] Field of Search ................. 350/1.2, 1.3, 1.4, 410, 350/442, 443, 444, 453, 479, 480, 481, 503, 504, 505

[56] References Cited

U.S. PATENT DOCUMENTS

| 3,947,084 | 3/1976 | Noyes | 350/1.3 |
| 4,398,786 | 8/1983 | Neil | 350/1.2 |
| 4,432,596 | 2/1984 | Campbell et al. | 350/1.3 |

FOREIGN PATENT DOCUMENTS

| 1594966 | 6/1977 | United Kingdom . |
| 2057157B | 7/1980 | United Kingdom . |
| 2072871 | 2/1981 | United Kingdom . |
| 2076987 | 5/1981 | United Kingdom . |
| 2080564B | 6/1981 | United Kingdom . |
| 2085184 | 9/1981 | United Kingdom . |
| 2085610 | 9/1981 | United Kingdom . |
| 2102588A | 6/1982 | United Kingdom . |

Primary Examiner—John K. Corbin
Assistant Examiner—B. S. Shapiro
Attorney, Agent, or Firm—F. Eugene Davis, IV

[57] ABSTRACT

An 'eye-piece' system for a non-Galilean afocal infra-red telescope designed to contribute to astigmatism correction, pupil match, and true afocality without undue increase in objective aperture requirements comprises a positively powered back group and a negatively powered front group consisting of a rear lens element with a convex rear surface and a front lens element with a concave front surface, there being a negatively powered gas lens between the rear and front elements of the front group. The objective system may be catadioptric.

19 Claims, 6 Drawing Figures

INFRA-RED OPTICAL SYSTEMS

BACKGROUND OF THE INVENTION

This invention concerns improvements in or relating to infra-red optical systems and relates more particularly to afocal optical systems for use at infra-red wavelengths.

Afocal optical systems, i.e. systems having an infinite focal length and therefore no apparent focussing action can be used where it is required that a beam of infra-red radiation from a distant source and incident on the optical system be reduced in diameter. Such reduction of beam diameter enables a comparatively small, high speed reflective scanning system to be employed in order to provide the requisite scanning of the field of view across an imaging lens plus line detector array.

It has previously been proposed to use for such infra-red optical systems a non-Galilean afocal telescope having an objective system which produces an intermediate real image that is viewed by an "eye-piece" system comprising two meniscus lens elements disposed with their convex surfaces facing each other (see U.S. Pat. No. 3,947,084). It will be understood that the term "eye-piece" is used in this context although the ultimate image is not viewed by the human eye but is, for example, scanned across an infra-red detector array. It has been found that an afocal infra-red telescope employing such an "eye-piece" system can suffer from problems of astigmatism, of improper match between the "exit pupil" of the objective system and the "entrance pupil" of the "eye-piece" system, and of the telescope not being truly afocal at all scan angles. There is a requirement for overcoming or reducing such problems, and for doing so without unduly increasing the aperture requirements in, and in front of, the objective system.

SUMMARY OF THE INVENTION

According to the present invention there is provided an "eye-piece" system for a non-Galilean afocal infra-red optical system, the "eye-piece" system comprising a back lens element or group of positive power, and a front lens group of negative power comprising a rear lens element with a convex rear surface and a front lens element with a concave front surface, there being a gas lens of negative power between the rear and front elements of the front lens group. In the present description the back or rear of the system is considered to face towards the exit pupil and the front of the system is considered to face towards the direction from which infra-red radiation is received; the terms "front", "back" and "rear" when used, in particular, in relation to groups of elements or individual elements or to the surfaces of such elements, are to be construed accordingly. Further, for the avoidance of possible doubt, it is intended that two elements can form a "group".

Said back lens element or group of positive power may, but need not necessarily, consist of a pair of positively powered meniscus elements disposed with their convex surfaces facing each other. It can alternatively consist, for example, of a meniscus element and a bi-convex element, or of a pair of meniscus elements whose concave surfaces face in the same direction, and in particular rearwardly, or of a single meniscus element.

The front lens group of negative power may have the rear lens element of positive power and the front lens element of negative power and preferably, but not essentially, the gas lens of negative power is formed between a front concave surface of said rear element and a rear concave surface of said front element of the front lens group. The gas lens can alternatively be formed, for example, between a front concave surface of said rear element and a rear planar, or even convex, surface of said front element of the front lens group. Conveniently the gas lens is an air lens and the solid lens elements of the "eye-piece" system are air spaced, although a suitable gas other than air could be used.

The solid lens elements are, of course, of a material having a useful spectral bandpass in the region of the infra-red spectrum at which the system is required to operate. Preferably the curved surfaces of the lens elements are of spherical curvature although one or more aspheric surfaces could be employed if desired.

The front lens group is preferably relatively well spaced from said back lens element or group, but this is not essential and the front surface of said back lens element or group can be closely adjacent or effectively in contact with the rear surface of the front lens group. The ratio of the absolute focal length of the front lens group to that of said back lens element or group (i.e. the focal length of the front lens group ignoring the negative sign divided by the focal length of said back lens element or group) may, for example, lie in the range 1.5 to 3.5.

The present invention further provides a non-Galilean afocal infra-red optical system comprising an objective system in combination with an "eye-piece" system as set forth above. The objective system may, for example, be a catadioptric system having reflecting powered elements, or could be a refractive objective system in which all the powered elements are refracting elements.

BRIEF DESCRIPTION OF THE DRAWINGS

Particular embodiments of "eye-piece" systems, and afocal optical systems, in accordance with the invention will now be described, by way of example, with reference to the accompanying drawings, in which.

DESCRIPTION OF THE PREFERRED EMBODIMENTS

Figure 1:
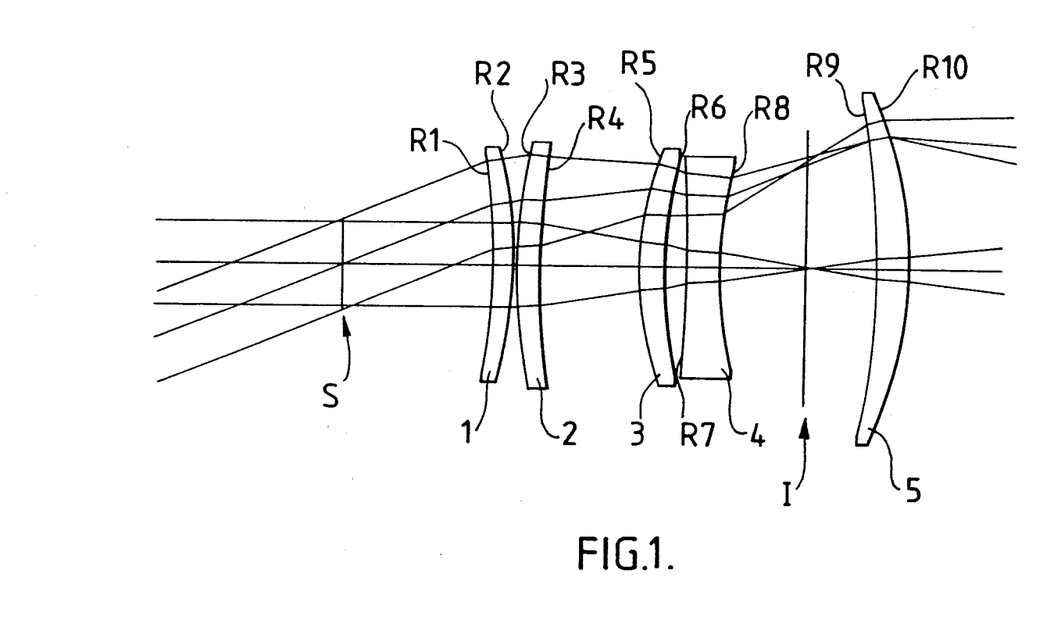
FIG. 1 is a schematic representation of a first embodiment of "eye-piece" system.

The "eye-piece" system shown in FIG. 1 receives infra-red radiation from a real image position I and collimates that radiation to a scanning space S at which a scanner (not shown) operates in known manner. The "eye-piece" system comprises four lens elements 1, 2, 3 and 4.

The back (i.e. to the left as viewed in FIG. 1) elements 1 and 2 constitute a back group comprising a pair of positively powered meniscus elements disposed with their convex surfaces R2 and R3 facing each other. Their concave surfaces R1 and R4 thus face outwardly, i.e. the concave surface R1 faces rearwardly towards the scanner space S and the concave surface R4 faces forwardly. The forwardly facing convex front surface R2 of the back element 1 of the pair and the rearwardly facing convex back surface R3 of the front element 2 of the pair are closely spaced and define between them an air lens of positive power.

The elements 3 and 4 are located in front of the pair of elements 1 and 2, i.e. between the element 2 and the image position I. The elements 3 and 4 are closely spaced and constitute a front lens group of negative power in which the rear element 3 is of positive power and has a convex rear surface R5, while the front element 4 is of negative power and has a concave front surface R8. The rear element 3 of the group has a front concave surface R6 and the front element 4 has a rear concave surface R7, these concave surfaces R6 and R7 forming or defining between them an air lens of negative power.

FIG. 1 shows a further lens element 5 of positive power located on the opposite side of the image position I from the group of elements 3 and 4. The element 5, which is of meniscus shape with its convex surface R10 to the front and its concave surface R9 to the back, i.e. facing towards the image position I, can be considered as a field lens or perhaps as part of the objective system with which the "eye-piece" system is used.

Figure 2:
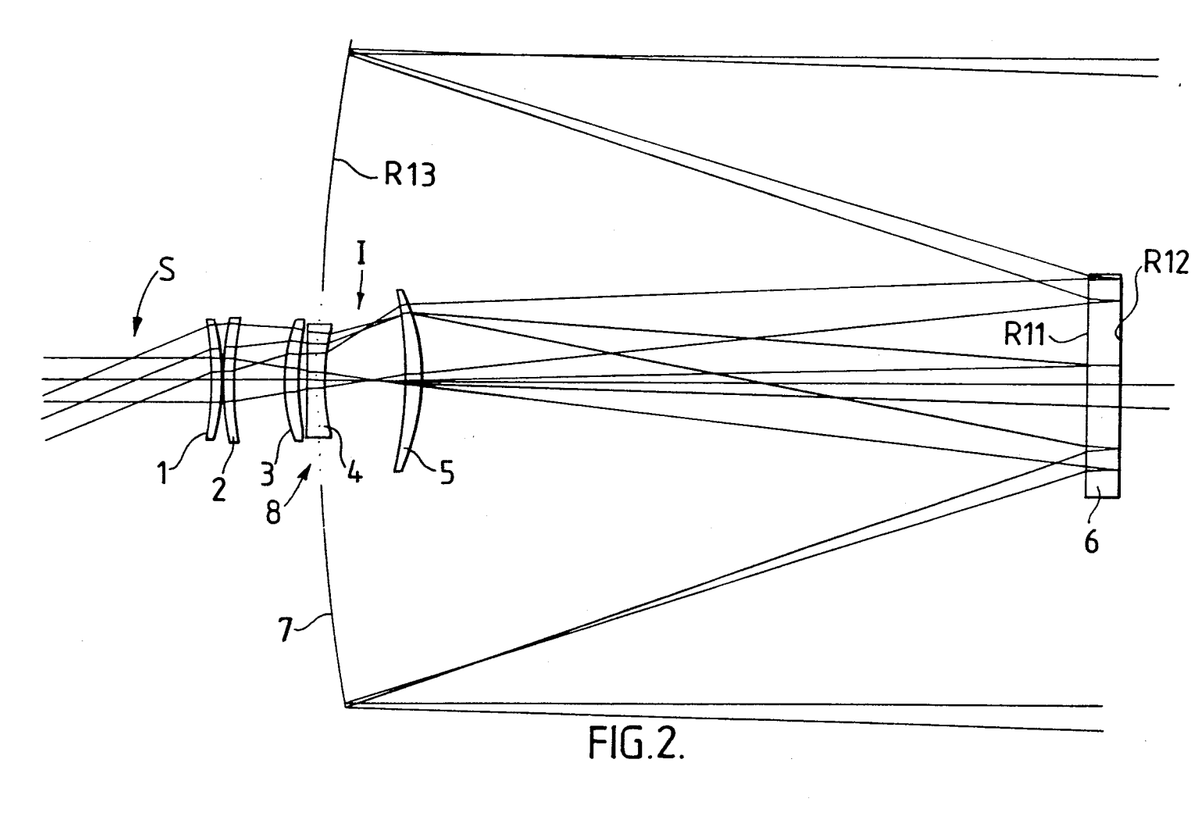
FIG. 2 is a schematic representation of a non-Galilean afocal infra-red telescope employing the "eye-piece" system of FIG. 1 with a catadioptric objective system.

A catadioptric objective system is shown in FIG. 2. It comprises a Mangin secondary mirror 6 having a first concave surface R11 and an internally convex mirrored surface R12, and a primary mirror 7 having a concave mirrored front surface R13. The primary mirror 7 has a central aperture 8 through which radiation passes to the "eye-piece" system.

In use infra-red radiation from a distant scene or object is received by the primary mirror 7 and reflected from the surface R13 to the Mangin secondary mirror. It is transmitted (with refraction) through the surface R11, reflected internally from the mirrored surface R12, and then transmitted (with refraction) again through the surface R11. The radiation from the Mangin secondary mirror is transmitted through the field lens element 5 to the image position I at which it is focussed to form an image of the distant scene or object. Radiation from this intermediate image is transmitted through the refracting elements 4, 3, 2, and 1 of the "eye-piece" system to the scanner space S at which there is effectively formed a collimated magnified view of the scene or object.

The negatively powered lens group formed by elements 3 and 4 in the "eye-piece" system has three main purposes. Firstly it contributes towards astigmatism correction of the afocal telescope. Secondly it matches the "entrance pupil" of the "eye-piece" system and the "exit pupil" of the objective system. Thirdly it overcorrects the Petzval sum of the "eye-piece" system such that the afocal telescope is truly afocal at all scan angles. Additionally and importantly, however, it fulfills these purposes while minimising the aperture requirements in, and in front of, the objective system. It will be understood by those skilled in the art that these three main purposes could in principle by met by a thick meniscus lens element having a back convex surface and a front concave surface. However, if this is done, the concave surface can become excessively steep, giving rise to increased pupil spherical aberration. This increases the aperture requirements in, and in front of, the objective system. Thus, in the described embodiment of objective system it could increase the aperture requirements of the primary mirror 7 and of any scanning mirror and/or window which may be located in front of the objective system. By having a negatively powered air lens between elements 3 and 4 in accordance with the invention, the power of the outer negative curve can be reduced relatively and therefore pupil spherical aberration can be correspondingly reduced. Thus the radius of curvature of the concave surface R8 may, as in the embodiments shown, be greater than that of the convex surface R5.

In the particular embodiment shown in FIG. 1 by way of example the negative air lens is formed between concave surfaces R6 and R7. It is not, however, essential that the surfaces defining the air lens should both be concave and one of them could be planar or even convex so long as the air lens is of negative power. Further, although the particular preferred embodiment employs a negatively powered air lens, it will be appreciated that the negatively powered lens could be of a suitable gas other than air. Thus, while the solid lens elements are in the particuar described embodiment and for convenience air spaced, it will be understood that some other suitable gas could be used with appropriate design or optimisation to allow for the relevant optical properties of the respective gas. It will be understood that the solid lens elements (1 to 6 in the particular embodiment of FIG. 2) are of an infra-red transmitting material having a useful spectral bandpass in the required infra-red wavelength region, which may be the 8 to 13 micron waveband or could be the 3 to 5.5 micron waveband.

Yet further, in the particular preferred embodiments all the curved lens surfaces are of spherical curvature, but it will be appreciated that one or more aspheric surfaces could be used if desired. Further still, it will be understood that a catadioptric objective system is described above by way of illustration and example and that an "eye-piece" system in accordance with the invention could be used in combination with any other suitable form of objective system and in particular an objective system whose powered elements are all refracting elements.

Figure 3:
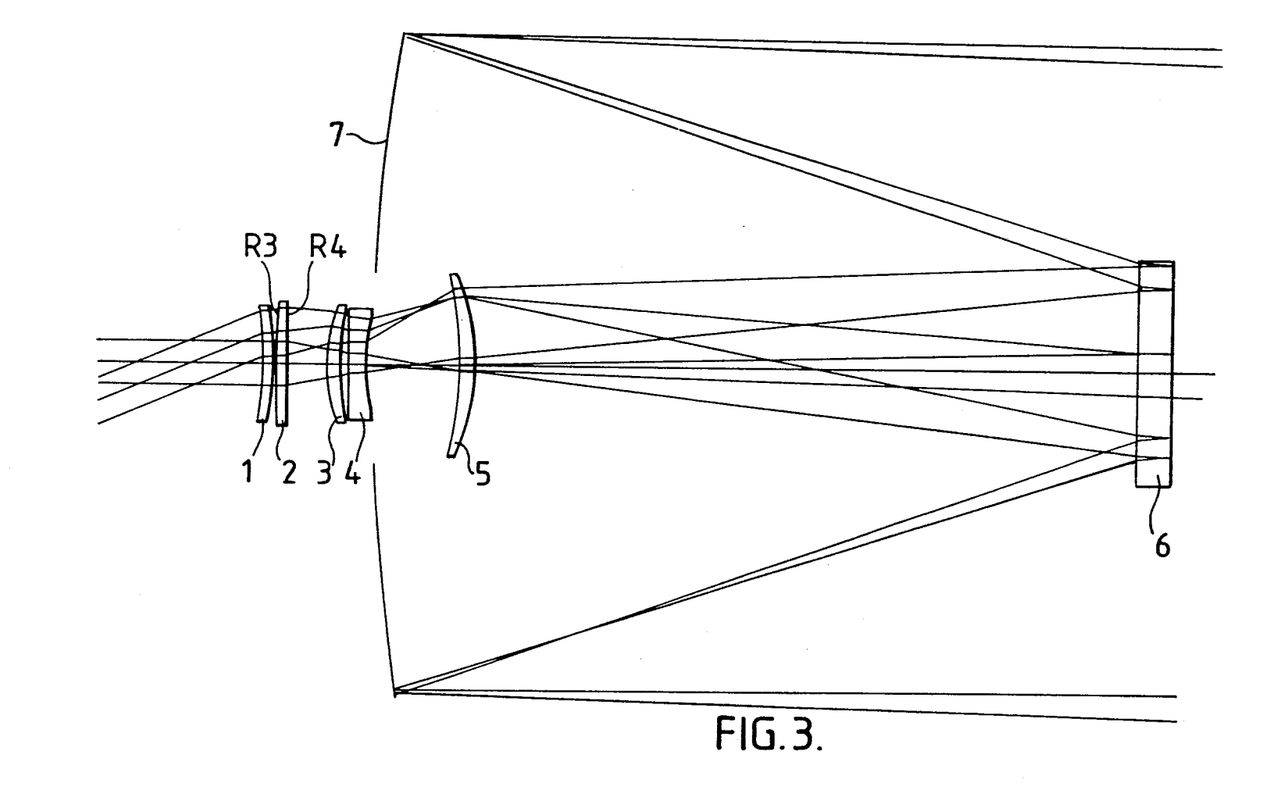
FIGS. 3, 4, 5 and 6 are schematic representations similar to FIG. 2 showing further embodiments.
Figure 4:
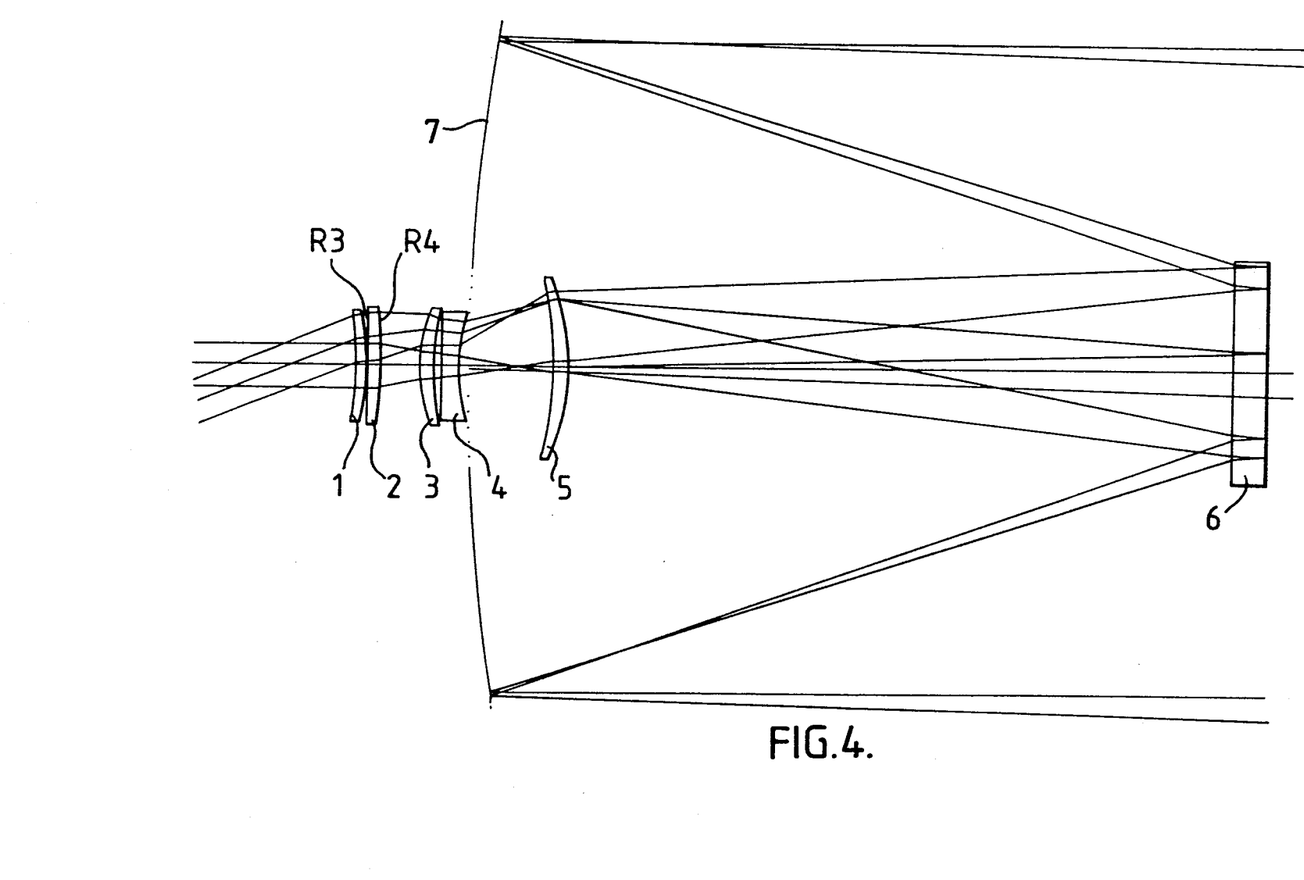
Figure 5:
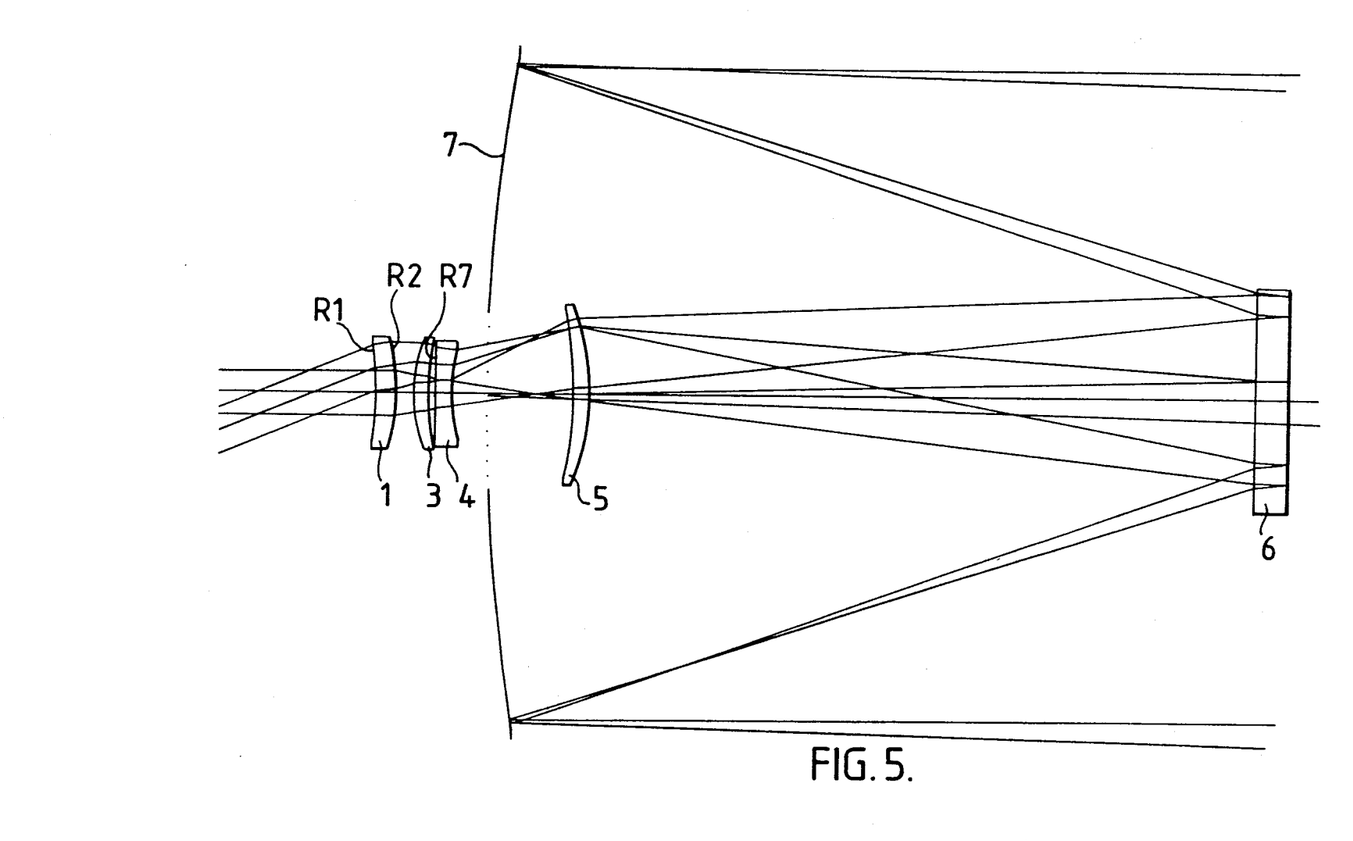
Figure 6:
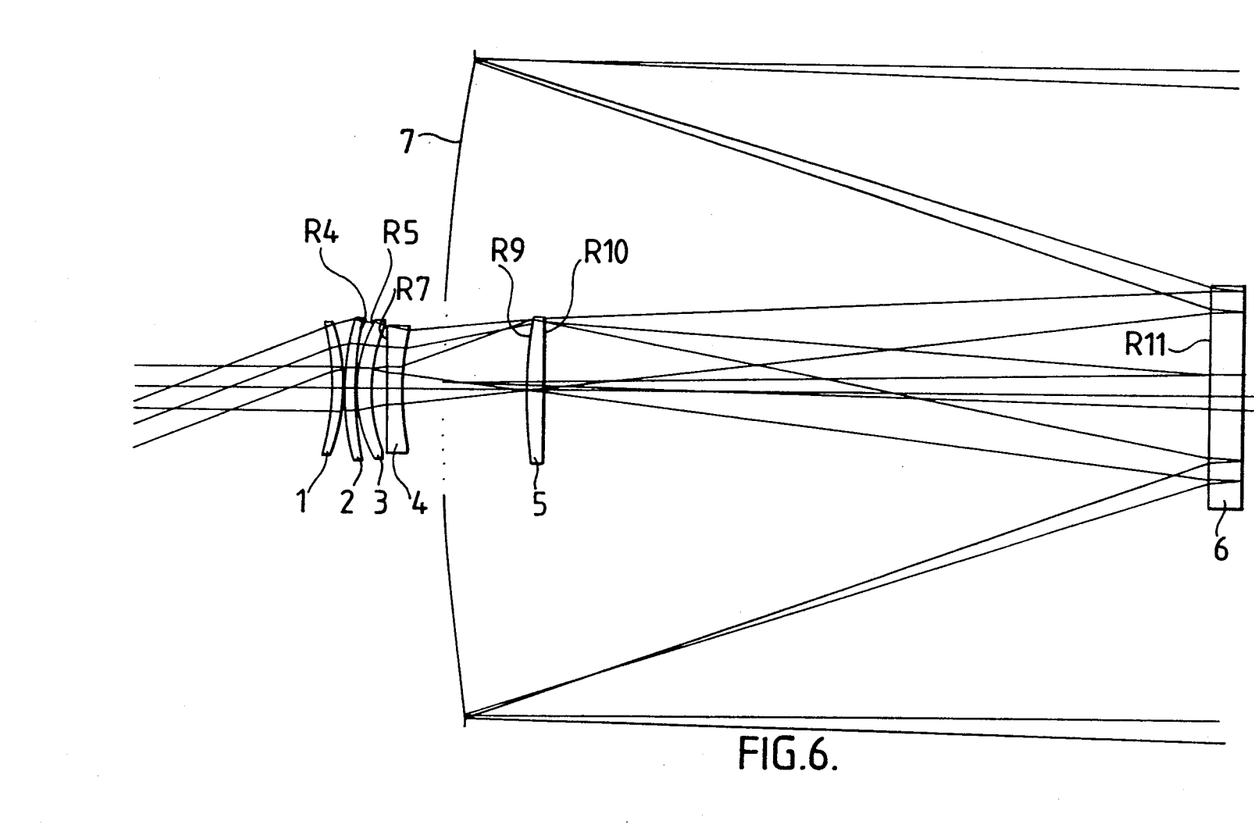

FIGS. 3 to 6 illustrate further embodiments which are basically similar to that of FIG. 2 but with differences as follows. In FIG. 3 the front lens element 2 of the back group is biconvex instead of meniscus (i.e. its front surface R4 is convex as well as its back surface R3). In FIG. 4 this lens element 2 is meniscus but bent the same way as the back lens element 1, i.e. with its concave surface R3 facing rearwardly and its convex surface R4 facing forwardly. In FIG. 5 the back group of two lens elements 1 and 2 in the other embodiments is replaced by a single meniscus element 1 whose concave surface R1 faces rearwardly and whose convex surface R2 faces forwardly. Also in FIG. 5 the rear surface R7 of the front lens element 4 of the front lens group is planar. In FIG. 6 this surface R7 is convex and the back and front lens groups are closely adjacent (whereas in the other embodiments they are relatively well spaced). Thus in FIG. 6 the front surface R4 of the back lens group is closely adjacent or virtually in contact with the rear surface R5 of the front lens group. Also in FIG. 6 the meniscus field lens element 5 is disposed with its convex surface R9 facing towards the intermediate image and its concave surface R10 facing towards the Mangin secondary mirror 6 whose first surface R11 is planar.

Particular examples of non-Galilean afocal infra-red optical systems or telescopes in accordance with the FIGS. 2 to 6 embodiments have numerical data as given below under Examples 1 to 5 respectively. The dimensiional units are millimeters but the values are relative and can be scaled accordingly. These examples are all designed to operate in the thermal 8 to 13 micron waveband and the material of the lens elements 1 to 6 is Germanium in each case. Example 4 omits lens element 2 and surfaces R3 and R4 since in that example there is only a single back lens element 1 in accordance with FIG. 5. Each of these examples provides a magnification of X15, a field view of 46 degrees, and an exit pupil diameter of 17.5 mm.

EXAMPLE 1 (FIG. 2)

| Element | Surface | Radius of Curvature | Axial Thickness/ Separation | Focal Length |
|---|---|---|---|---|
| 1 | R1 | −146.54 | | |
|   |    |         | 4.20 | 88.5 |
|   | R2 | −96.505 | | |
|   |    |         | 0.50 | |
| 2 | R3 | +125.22 | | |
|   |    |         | 4.65 | 123.7 |
|   | R4 | +183.66 | | |
|   |    |         | 19.75 | |
| 3 | R5 | +68.285 | | |
|   |    |         | 5.50 | 50.0 |
|   | R6 | +117.64 | | |
|   |    |         | 4.02 | |
| 4 | R7 | −500.38 | | |
|   |    |         | 6.60 | −25.4 |
|   | R8 | +91.034 | | |
|   |    |         | 31.83 | |
| 5 | R9 | −196.48 | | |
|   |    |         | 6.35 | 60.3 |
|   | R10 | −96.505 | | |
|   |    |         | 267.8 | |
| 6 | R11 | −2980.4 | | |
|   |    |         | 12.7 | |
|   | R12 | +2286.0 | | −180.3 |
|   |    |         | −12.7 | |
|   | R11 | −2980.4 | | |
|   |    |         | −308.1 | |
| 7 | R13 | +845.25 | | |

Back group (elements 1 and 2) focal length: 50.7
Front group (elements 3 and 4) focal length: −78.7

EXAMPLE 2 (FIG. 3)

| Element | Surface | Radius of Curvature | Axial Thickness Separation | Focal Length |
|---|---|---|---|---|
| 1 | R1 | −138.07 | | |
|   |    |         | 4.20 | 99.7 |
|   | R2 | −96.67 | | |
|   |    |         | 0.5 | |
| 2 | R3 | +413.56 | | |
|   |    |         | 4.65 | 92.8 |
|   | R4 | −846.67 | | |
|   |    |         | 15.07 | |
| 3 | R5 | +66.25 | | |
|   |    |         | 5.50 | 48.8 |
|   | R6 | +113.36 | | |
|   |    |         | 3.42 | |
| 4 | R7 | −1110.3 | | |
|   |    |         | 6.60 | −24.8 |
|   | R8 | +80.03 | | |
|   |    |         | 36.85 | |
| 5 | R9 | −176.21 | | |
|   |    |         | 6.35 | 55.1 |
|   | R10 | −94.00 | | |
|   |    |         | 267.8 | |
| 6 | R11 | −3068.7 | | |
|   |    |         | 12.70 | |
|   | R12 | +2247.1 | | −161 |
|   |    |         | −12.70 | |
|   | R11 | −3068.7 | | |
|   |    |         | 308.1 | |
| 7 | R13 | +845.25 | | |

Back group (elements 1 and 2) focal length: 47.7
Front group (elements 3 and 4) focal length: −75.2

EXAMPLE 3 (FIG. 4)

| Element | Surface | Radius of Curvature | Axial Thickness/ Separation | Focal Length |
|---|---|---|---|---|
| 1 | R1 | −135.07 | | |
|   |    |         | 4.20 | 109.3 |
|   | R2 | −97.94 | | |
|   |    |         | 0.5 | |
| 2 | R3 | −846.7 | | |
|   |    |         | 4.65 | 92.7 |
|   | R4 | −210.32 | | |
|   |    |         | 15.78 | |
| 3 | R5 | +63.32 | | |
|   |    |         | 5.50 | 44.4 |
|   | R6 | +112.78 | | |
|   |    |         | 3.29 | |
| 4 | R7 | −1947.0 | | |
|   |    |         | 6.60 | −24.4 |
|   | R8 | +76.42 | | |
|   |    |         | 37.58 | |
| 5 | R9 | −172.09 | | |
|   |    |         | 6.35 | 63.7 |
|   | R10 | −93.09 | | |
|   |    |         | 267.8 | |
| 6 | R11 | −2812.8 | | |
|   |    |         | 12.7 | |
|   | R12 | +2367.3 | | −180.2 |
|   |    |         | −12.7 | |
|   | R11 | −2812.8 | | |
|   |    |         | −308.1 | |
| 7 | R13 | +845.25 | | |

Back group (elements 1 and 2) focal length: 50.0
Front group (elements 3 and 4) focal length: −88.9

EXAMPLE 4 (FIG. 5)

| Element | Surface | Radius of Curvature | Axial Thickness/ Separation | Focal Length |
|---|---|---|---|---|
| 1 | R1 | −165.65 | | |
|   |    |         | 8.32 | 50.0 |
|   | R2 | −81.69 | | |
|   |    |         | 7.02 | |
| 3 | R5 | +61.26 | | |
|   |    |         | 5.50 | 42.6 |
|   | R6 | +109.63 | | |
|   |    |         | 3.03 | |
| 4 | R7 | PLANE | | |
|   |    |         | 6.60 | −25.3 |
|   | R8 | +76.24 | | |
|   |    |         | 47.96 | |
| 5 | R9 | −202.77 | | |
|   |    |         | 6.35 | 71.4 |
|   | R10 | −106.68 | | |
|   |    |         | 267.8 | |
| 6 | R11 | −2611.3 | | |
|   |    |         | 12.7 | |
|   | R12 | +2494.6 | | −180.5 |
|   |    |         | −12.7 | |
|   | R11 | −2611.3 | | |
|   |    |         | −308.1 | |
| 7 | R13 | +845.25 | | |

Back element (1) focal length: 50.0
Front group (elements 3 and 4) focal length: −110.9

EXAMPLE 5 (FIG. 6)

| Element | Surface | Radius of Curvature | Axial Thickness/ Separation | Focal Length |
|---|---|---|---|---|
| 1 | R1 | −105.94 | | |
|   |    |         | 4.20 | 201.3 |
|   | R2 | −92.83 | | |
|   |    |         | 0.50 | |
| 2 | R3 | +104.66 | | |
|   |    |         | 4.65 | 99.9 |
|   | R4 | +155.33 | | |

-continued

| Element | Surface | Radius of Curvature | Axial Thickness/ Separation | Focal Length |
|---|---|---|---|---|
| 3 | R5 | +60.15 | 0.51 | |
| | R6 | +72.83 | 6.14 | 84.4 |
| 4 | R7 | +309.18 | 5.21 | |
| | R8 | +100.24 | 6.60 | −50.6 |
| 5 | R9 | +190.96 | 50.47 | |
| | R10 | +508.0 | 6.35 | 100.4 |
| 6 | R11 | PLANE | 267.8 | |
| | R12 | +1578.4 | 12.7 | −186.0 |
| | R11 | PLANE | −12.7 | |
| 7 | R13 | +845.25 | −320.8 | |

Back group (elements 1 and 2) focal length: 65.1
Front group (elements 3 and 4) focal length: −217.6

I claim:

1. An 'eye-piece' system for a non-Galilean afocal infra-red optical system, the 'eye-piece' system comprising a back lens element or group of positive power, and a front lens group of negative power which contributes towards astigmatism correction, which effects pupil matching, and which overcorrects the Petzval sum, said front lens group comprising a rear lens element with a convex rear surface, a front lens element with a concave front surface, and a biconvex or plano convex gas lens of negative power between the rear and front elements of the front lens group, said concave front surface of said front lens element having a radius of curvature greater than that of said convex rear surface of said rear lens element, and said front lens group spaced from said back lens element by a distance greater than that between said rear and said front elements of said front lens group.

2. An 'eye-piece' system according to claim 1 in which said back lens element or group of positive power consists of a pair of positively powered meniscus elements disposed with their convex surfaces facing each other.

3. An 'eye-piece' system according to claim 1 in which said back lens element or group of positive power comprises a meniscus element.

4. An 'eye-piece' system according to claim 1 in which said front lens group of negative power has the rear lens element of positive power and the front lens element of negative power.

5. An 'eye-piece' system according to claim 1 in which said gas lens of negative power is formed between a front concave surface of said rear element and a rear surface of said front element of the front lens group.

6. An 'eye-piece' system according to claim 1 in which the front surface of said back lens element or group is closely adjacent or effectively in contact with the rear surface of the front lens group.

7. An 'eye-piece' system according to claim 1 in which the ratio of the absolute focal length of the front lens group to that of said back lens element or group is in the range 1.5 to 3.5.

8. An 'eye-piece' system according to claim 1 comprising lens elements 1 to 4 having axial thicknesses and separations, and whose surfaces R1 to R8 have radii of curvature substantially as follows:

| Element | Surface | Radius of Curvature | Axial Thickness/ Separation |
|---|---|---|---|
| 1 | R1 | −146.54 | 4.20 |
| | R2 | −96.505 | 0.50 |
| 2 | R3 | +125.22 | 4.65 |
| | R4 | +183.66 | 19.75 |
| 3 | R5 | +68.285 | 5.50 |
| | R6 | +117.64 | 4.02 |
| 4 | R7 | +500.38 | 6.60 |
| | R8 | +91.034 | |

9. An 'eye-piece' system according to claim 1 comprising lens elements 1 to 4 having axial thicknesses and separations, and whose surfaces R1 to R8 have radii of curvature, substantially as follows:

| Element | Surface | Radius of Curvature | Axial Thickness/ Separation |
|---|---|---|---|
| 1 | R1 | −138.07 | 4.20 |
| | R2 | −96.67 | 0.5 |
| 2 | R3 | +413.56 | 4.65 |
| | R4 | −846.67 | 15.07 |
| 3 | R5 | +66.25 | 5.50 |
| | R6 | +113.36 | 3.42 |
| 4 | R7 | −1110.3 | 6.60 |
| | R8 | +80.03 | |

10. An 'eye-piece' system according to claim 1 comprising lens elements 1 to 4 having axial thicknesses and separations, and whose surfaces R1 to R8 have radii of curvature, substantially as follows:

| Element | Surface | Radius of Curvature | Axial Thickness/ Separation |
|---|---|---|---|
| 1 | R1 | −135.07 | 4.20 |
| | R2 | −97.94 | 0.5 |
| 2 | R3 | −846.7 | 4.65 |
| | R4 | −210.32 | 15.78 |
| 3 | R5 | +63.32 | 5.50 |
| | R6 | +112.78 | 3.29 |
| 4 | R7 | −1947.0 | 6.60 |
| | R8 | +76.42 | |

11. An 'eye-piece' system according to claim 1 comprising elements 1, 3 and 4 having axial thicknesses and separations, and whose surfaces R1, R2 and R5 to R8 have radii of curvature, substantially as follows:

| Element | Surface | Radius of Curvature | Axial Thickness/Separation |
|---|---|---|---|
| 1 | R1 | −165.65 | |
| | | | 8.32 |
| | R2 | −81.69 | |
| | | | 7.02 |
| 3 | R5 | +61.26 | |
| | | | 5.50 |
| | R6 | +109.63 | |
| | | | 3.03 |
| 4 | R7 | PLANE | |
| | | | 6.60 |
| | R8 | +76.24 | |

12. A non-Galilean afocal infra-red optical system comprising an objective system in combination with an 'eye-piece' system according to claim 1.

13. A non-Galilean afocal infra-red optical system according to claim 12 in which the objective system is a catadioptric system.

14. A non-Galilean afocal infra-red optical system according to claim 13 comprising lens elements 1 to 5, a Mangin secondary mirror 6, and a primary mirror 7 having axial thicknesses and separations, and whose surfaces R1 to R13 have radii of curvature, substantially as follows:

| Element | Surface | Radius of Curvature | Axial Thickness/Separation |
|---|---|---|---|
| 1 | R1 | −146.54 | |
| | | | 4.20 |
| | R2 | −96.505 | |
| | | | 0.50 |
| 2 | R3 | +125.22 | |
| | | | 4.65 |
| | R4 | +183.66 | |
| | | | 19.75 |
| 3 | R5 | +68.285 | |
| | | | 5.50 |
| | R6 | +117.64 | |
| | | | 4.02 |
| 4 | R7 | −500.38 | |
| | | | 6.60 |
| | R8 | +91.034 | |
| | | | 31.83 |
| 5 | R9 | −196.48 | |
| | | | 6.35 |
| | R10 | −96.505 | |
| | | | 267.8 |
| 6 | R11 | −2980.4 | |
| | | | 12.7 |
| | R12 | +2286.0 | |
| | | | −12.7 |
| | R11 | −2980.4 | |
| | | | −308.1 |
| 7 | R13 | +845.25 | |

15. A non-Galilean afocal infra-red optical system according to claim 13 comprising lens elements 1 to 5, a Mangin secondary mirror 6, and a primary mirror 7 having axial thicknesses and separations, and whose surfaces R1 to R13 have radii of curvature, substantially as follows:

| Element | Surface | Radius of Curvature | Axial Thickness/Separation |
|---|---|---|---|
| 1 | R1 | −138.07 | |
| | | | 4.20 |
| | R2 | −96.67 | |
| | | | 0.5 |
| 2 | R3 | +413.56 | |
| | | | 4.65 |
| | R4 | −846.67 | |
| | | | 15.07 |
| 3 | R5 | +66.25 | |
| | | | 5.50 |
| | R6 | +113.36 | |
| | | | 3.42 |
| 4 | R7 | −1110.3 | |
| | | | 6.60 |
| | R8 | +80.30 | |
| | | | 36.85 |
| 5 | R9 | −176.21 | |
| | | | 6.35 |
| | R10 | −94.00 | |
| | | | 267.8 |
| 6 | R11 | −3068.7 | |
| | | | 12.70 |
| | R12 | +2247.1 | |
| | | | −12.70 |
| | R11 | −3068.7 | |
| | | | −308.1 |
| 7 | R13 | +845.25 | |

16. A non-Galilean afocal infra-red optical system according to claim 13 comprising lens elements 1 to 5, a Mangin secondary mirror 6, and a primary mirror 7 having axial thicknesses and separations, and whose surfaces R1 to R13 have radii of curvature, substantially as follows:

| Element | Surface | Radius of Curvature | Axial Thickness/Separation |
|---|---|---|---|
| 1 | R1 | −135.07 | |
| | | | 4.20 |
| | R2 | −97.94 | |
| | | | 0.5 |
| 2 | R3 | −846.7 | |
| | | | 4.65 |
| | R4 | −210.32 | |
| | | | 15.78 |
| 3 | R5 | +63.32 | |
| | | | 5.50 |
| | R6 | +112.78 | |
| | | | 3.29 |
| 4 | R7 | −1947.0 | |
| | | | 6.60 |
| | R8 | +76.42 | |
| | | | 37.58 |
| 5 | R9 | −172.09 | |
| | | | 6.35 |
| | R10 | −93.09 | |
| | | | 267.8 |
| 6 | R11 | −2812.8 | |
| | | | 12.7 |
| | R12 | +2367.3 | |
| | | | −12.7 |
| | R11 | −2812.8 | |
| | | | −308.1 |
| 7 | R13 | +845.25 | |

17. A non-Galilean afocal infra-red optical system according to claim 13 comprising lens elements 1 and 3 to 5, a Mangin secondary mirror 6, and a primary mirror 7 having axial thicknesses and separations, and whose surfaces R1, R2 and R5 to R13 have radii of curvature, substantially as follows;

| Element | Surface | Radius of Curvature | Axial Thickness/Separation |
|---|---|---|---|
| 1 | R1 | −165.65 | |
| | | | 8.32 |
| | R2 | −81.69 | |
| | | | 7.02 |

-continued

| Element | Surface | Radius of Curvature | Axial Thickness/Separation |
|---|---|---|---|
| 3 | R5 | +61.26 | |
| | | | 5.50 |
| | R6 | +109.63 | |
| | | | 3.03 |
| | R7 | PLANE | |
| 4 | | | 6.60 |
| | R8 | +76.24 | |
| | | | 47.96 |
| | R9 | −202.77 | |
| 5 | | | 6.35 |
| | R10 | −106.68 | |
| | | | 267.8 |
| | R11 | −2611.3 | |
| 6 | | | 12.7 |
| | R12 | +2494.6 | |
| | | | −12.7 |
| | R11 | −2611.3 | |
| | | | −308.1 |
| 7 | R13 | +845.25 | |

18. An 'eye-piece' system for a non-Galilean afocal infrared optical system comprising lens elements 1 to 4 having axial thicknesses and separations, and whose surfaces R1 to R8 have radii of curvature, substantially as follows:

| Element | Surface | Radius of Curvature | Axial Thickness/Separation |
|---|---|---|---|
| 1 | R1 | −105.94 | |
| | | | 4.20 |
| | R2 | −92.83 | |
| | | | 0.50 |
| | R3 | +104.66 | |
| 2 | | | 4.65 |
| | R4 | +155.33 | |
| | | | 0.51 |
| | R5 | +60.15 | |
| 3 | | | 6.14 |
| | R6 | +72.83 | |
| | | | 5.21 |
| | R7 | +309.18 | |
| 4 | | | 6.60 |
| | R8 | +100.24 | |

19. A non-Galilean afocal infra-red optical system comprising lens elements 1 to 5, a Mangin secondary mirror 6, and a primary mirror 7 having axial thicknesses and separations, and whose surfaces R1 to R13 have radii of curvature, substantially as follows:

| Element | Surface | Radius of Curvature | Axial Thickness/Separation |
|---|---|---|---|
| 1 | R1 | −105.94 | |
| | | | 4.20 |
| | R2 | −92.83 | |
| | | | 0.50 |
| | R3 | +104.66 | |
| 2 | | | 4.65 |
| | R4 | +155.33 | |
| | | | 0.51 |
| | R5 | +60.15 | |
| 3 | | | 6.14 |
| | R6 | +72.83 | |
| | | | 5.21 |
| | R7 | +309.18 | |
| 4 | | | 6.60 |
| | R8 | +100.24 | |
| | | | 50.47 |
| | R9 | +190.96 | |
| 5 | | | 6.35 |
| | R10 | +508.0 | |
| | | | 267.8 |
| | R11 | PLANE | |
| 6 | | | 12.7 |
| | R12 | +1578.4 | |
| | | | −12.7 |
| | R11 | PLANE | |
| | | | +320.8 |
| 7 | R13 | +845.25 | |

* * * * *